(12) United States Patent
Beuschel et al.

(10) Patent No.: US 11,598,856 B2
(45) Date of Patent: Mar. 7, 2023

(54) RECEIVER ARRANGEMENT FOR THE RECEPTION OF LIGHT IMPULSES, LIDAR MODULE AND METHOD FOR RECEIVING LIGHT IMPULSES

(71) Applicant: Ibeo Automotive Systems GmbH, Hamburg (DE)

(72) Inventors: Ralf Beuschel, Wangen (DE); Ünsal Kabuk, Hamburg (DE)

(73) Assignee: Ibeo Automotive Systems GmbH, Hamburg (DE)

( * ) Notice: Subject to any disclaimer, the term of this patent is extended or adjusted under 35 U.S.C. 154(b) by 989 days.

(21) Appl. No.: 16/296,179

(22) Filed: Mar. 7, 2019

(65) Prior Publication Data

US 2019/0277952 A1  Sep. 12, 2019

(30) Foreign Application Priority Data

Mar. 8, 2018  (DE) .................... 10 2018 203 534.2

(51) Int. Cl.
| | |
|---|---|
| *G01S 7/4863* | (2020.01) |
| *G01S 7/484* | (2006.01) |
| *G01S 7/481* | (2006.01) |
| *G01S 7/4865* | (2020.01) |
| *G01S 17/931* | (2020.01) |

(52) U.S. Cl.
CPC ............ *G01S 7/4863* (2013.01); *G01S 7/484* (2013.01); *G01S 7/4815* (2013.01); *G01S 7/4865* (2013.01); *G01S 17/931* (2020.01)

(58) Field of Classification Search
CPC .... G01S 7/4863; G01S 17/931; G01S 7/4815; G01S 7/484; G01S 7/4865
See application file for complete search history.

(56) References Cited

U.S. PATENT DOCUMENTS 9,268,012 B2    2/2016  Ghosh et al.
2018/0209846 A1*  7/2018  Mandai ................. G01S 7/4863

* cited by examiner

*Primary Examiner* — Georgia Y Epps
*Assistant Examiner* — Don J Williams
(74) *Attorney, Agent, or Firm* — Myers Wolin, LLC

(57) ABSTRACT

A receiver assembly for receiving light pulses, a lidar module containing such a receiver assembly, and a method for receiving light pulses are proposed. There is at least one photosensitive receiver (SPAD) therein, which converts the light pulses into an electric signal. An evaluation circuit is connected to the receiver, which determines a distance between the receiver assembly and at least one object that reflects the light pulses from the electric signal, by means of a time-correlated photon counting with at least one histogram, via a time of flight of the light pulse. The evaluation circuit is configured to reduce the resolution of the distance determination starting at no further than a predetermined distance.

12 Claims, 3 Drawing Sheets

| bin resolution [ ps ] | distance resolution [ cm ] | number of bins for measurement range with 0 us pulse | pulse train |
|---|---|---|---|
| 125 | 1.88 | 16000 | 17600 |
| 250 | 3.75 | 8000 | 8800 |
| 500 | 7.50 | 4000 | 4400 |

RECEIVER ARRANGEMENT FOR THE RECEPTION OF LIGHT IMPULSES, LIDAR MODULE AND METHOD FOR RECEIVING LIGHT IMPULSES

CROSS-REFERENCE TO RELATED APPLICATIONS

This application claims the benefit of priority under 35 U.S.C. § 119(a) of German Application No. 10 2018 203 534.2, filed Mar. 8, 2018, the content of which is incorporated herein by reference in its entirety.

FIELD

The invention relates to a receiver assembly for receiving light pulses, a lidar module, and a method for receiving light pulses as specified in the independent claims.

DESCRIPTION OF RELATED ART

A device and a method with which it is possible to make a three dimensional recording of objects by means of a two dimensional planar laser field is known from U.S. Pat. No. 9,268,012 B2. Groups of individual lasers can also be used in this laser field. These lasers are so-called VCSELs (Vertical Cavity Surface Emitting Lasers) and are normally produced as semiconductors. A corresponding optics element is disclosed, which aligns the laser beams in parallel. Furthermore, photodetectors are used, arranged in random or specific patterns. A micro-lens array is located in front of the photodetectors, such that each photodetector corresponds to a specific micro-lens. Such micro-lenses are also placed in front of the laser field.

SUMMARY

The receiver assembly according to the invention, for receiving light pulses, the lidar module, and the method for receiving light pulses, which have the features of the independent claims, have the advantage in that an evaluation circuit connected to the photosensitive receiver determines a distance between the receiver assembly and at least one object that reflects the light pulses from the electric signal originating in the receiver, by means of time-correlated photon counting with at least one histogram, via the time of flight of the light pulse. A starting signal for the emission of the light pulse is used in order to obtain the starting time for the time of flight. The evaluation circuit reduces the resolution of the distance determination starting at no further than a predetermined distance.

By using the time-correlated photon counting, it is possible to determine the distance very precisely, and the decrease in the resolution of the distance determination results in a reduction in the demand for memory space for the histogram, thus resulting in lower costs and effort.

The reduction in the distance determination, e.g. by a factor of 2, results in uncertainty of only a few centimeters, which at distances of over 100 or 150 meters are of little consequence, resulting in no disadvantages regarding the determination of the position and classification of an object with regard to a potential collision. The receiver assembly, the lidar module, and the method according to the invention are intended in particular for use in vehicles. The lidar technology has proven to be particularly effective here for determining distances and making precise object classifications in combination with other sensor systems, e.g. video cameras, radar and/or ultrasound.

The receiver assembly can receive light pulses, in particular laser pulses, reflected by objects in the surroundings, e.g. a vehicle. As a result, it is possible to identify or characterize said objects, and at least determine the distance thereto. The receiver assembly can be incorporated as a module in a vehicle, for example. It may also be the case, however, that the receiver assembly is composed of various components that are incorporated in the vehicle separately, and then interact according to the invention, and are interconnected accordingly.

The light pulses are normally laser pulses, as specified above, that are emitted from a transmitter circuit that contains a laser field or laser array, for example. As a result, it is possible in particular to determine the distance via the so-called time of flight, because the time of flight corresponds to twice the distance to the object, which is required for the light to travel from the receiver assembly to the object and back. These light pulses, typically laser pulses, are preferably in the infrared spectrum. They can also be in the visible spectrum. Accordingly, the emitter, thus the laser and the receiver, thus typically photodiodes, are configured with regard to the desired light, such that the emitted light can also be received by the receivers. The lasers are preferably semiconductor lasers, produced from connecting semiconductors. The laser pulses are emitted with a specific frequency or period, which generates a measurement of objects at a distance of 300 meters.

A photosensitive receiver of this type is a converter that converts light pulses into an electric signal. The photons of the light pulses are converted into an electrical current by the light receiver. As can be derived from the dependent claims, the receiver normally comprises a field of single photon avalanche diodes (SPADs), which can preferably be activated in columns or rows in response to a signal from a transmitter circuit. This means that in this example, a laser array is likewise activated in columns or rows, and the corresponding column or row is selected in the photodiode array, thus the receiver. This enables a sampling of the surroundings. In concrete terms, this means that when the first column in the laser array emits the light pulse, the first column or row in the photodiode array is activated such that only this first column or row is able to receive the light pulses reflected by the object.

The electric signal, a pulse or series of pulses, or some other type of signal containing information regarding the received light pulse, is supplied to an evaluation circuit. After processing, this electric signal is used to determine a distance between the receiver assembly and the at least one object that reflects the light pulse in a time-correlated photon counting with at least one histogram, via the time of flight of the light pulse. The photons and thus the corresponding electric signals at individual times determined by the evaluation circuit, and thus in particular with the time-correlated photon counting, are stored in the histogram or histograms stored in a memory. By making numerous measurements in each period in which a light pulse or a packet of light pulses is emitted, the most frequent time can then be determined with a maximum search, which is then used as the time of flight. It is then possible to determine the distance in a simple manner, based on the speed of light.

As can be derived from the dependent claims, at least one time to digital converter can be used for the time-correlated photon counting. Each electric signal is allocated a corresponding time, and this is then stored in the histogram.

This temporal resolution corresponds to the spatial resolution. According to the invention, it has been determined that the spatial resolution can be reduced for greater distances. As a result, the resolution is less precise, because the reduction in the resolution for the determination of the distance at these distances is negligible. By way of example, the reduction in resolution for the determination of a distance, and thus the temporal resolution, by a factor of 2, results in a reduction in memory space by half. By way of example, the typical temporal resolution for a time to digital converter is 125 ps. If this is doubled, the temporal resolution is 250 ps.

In the time-correlated photon counting, individual photons of the light pulse are recorded and counted, and entered in a histogram at the point when the photon or photons arrive. The emission of the light pulse and the counting are repeated numerous times. This results in a very precise time measurement of the light pulses. By way of example, numerous photons from an emission device strike an object, which are then received by the receiver assembly. As a result of this frequent repetition of the photon counting, it is possible to determine the time of flight of the light pulse. An analog/digital converter can be used for this, and the measured photon times are entered in a histogram in a memory, and the maximum is then determined based on a logical calculation. In the present case, a quick analog/digital converter with a temporal resolution of 500 MHz to 2 GHz is used in an advantageous embodiment of the invention. This can be implemented inexpensively with a so-called logarithmic flash analog/digital converter. In this case, a voltage is applied to resistors connected in series, wherein inputs to comparators are connected to the resistors. This serial connection is referred to in English as a voltage ladder.

One advantage with this method is that weak signals received from objects at great distances can be detected with the time-correlated photon counting. As a result of the multiple repetitions of the measurements and the acquisitions in a histogram, the desired signal can be amplified with respect to disruptive ambient light, although a high sampling rate of 10 GHz currently cannot be implemented inexpensively.

The evaluation circuit should reduce the resolution as described above starting at no further than a predetermined distance. This can be controlled, i.e. it is already given that at specific times this takes place for a specific period of time, and thus shorter distances will not be detected in this time period, or it is possible to make this adaptive, i.e. as a result of an estimation of the distance, the resolution can be reduced or increased as an object approaches. The evaluation circuit can be in the form of an integrated semiconductor component, e.g. made of silicon, or it can comprise various semiconductor components, or it can be composed of a combination of discrete electric and electronic components.

The object is normally another vehicle, a pedestrian, a stationary object, e.g. a rock, a street sign, etc.

The starting signal for emitting the light pulse is a signal sent from an emission circuit that the laser has for emitting light pulses to the receiver assembly, this being when the emission of the light pulse takes place, i.e. the temporal zero point for the time of flight of the light pulse is characterized by this starting signal. This starting signal can be electric, and can be conveyed to the receiver assembly via corresponding interfaces accordingly. An alternative is the use of the emitted light, i.e. the emitted light is bundled directly in the receiver assembly, and then converted there into an electric starting signal. The information in the starting signal can be modulated digitally or in analog form.

The reduction of the resolution of the distance determination means that the lowest temporal resolution is increased, as explained above, i.e. instead of 125 ps, as explained above, it is then 250 ps. This corresponds to a reduction in the spatial resolution, because this relates to the speed of light, at which the light pulses travel, corresponding to 125 ps for a spatial resolution of 1.88 cm and 250 ps for 3.75 cm. If the temporal resolution is doubled again, such that the resolution is only 500 ps, the spatial resolution is reduced to 7.5 cm. A distance of 300 m is to be covered in street traffic, in particular. At the speed of light, this corresponds to a measurement period of 2000 ns, i.e. 2 µs. This is the length of the period specified above. The length of a pulse is 200 ns. The measurements can be stored in the histogram in this time, 2 µs.

The evaluation circuit can be an integrated circuit made of silicon, but it can also be composed of various semiconductor components, discrete components, or a combination thereof. Portions of the signal processing can be also be carried out by software running on the evaluation circuit.

Further advantageous embodiments of the receiver assembly, lidar module, and the method for receiving light signals described in the independent claims can be derived from the dependent claims.

It is particularly advantageous that the evaluation circuit has a control unit, which reduces a cycle for determining the distance from the electric signal for a predetermined time period. By reducing the cycle, the temporal and thus the spatial resolution is reduced, as described above. This control unit can be a software command, e.g. a signal, which supplies the time to digital converter with a cycle that has been halved, or ensures that this signal is reduced. This signal can come, for example, from another component of the evaluation circuit, or from outside the evaluation circuit.

It is also advantageous that the evaluation circuit has at least one time to digital converter for time-correlated photon counting, wherein the control unit reduces the cycle of the at least one time to digital converter. A time to digital converter comprises a method for determining a time, e.g. between two pulses, and converting this to a digital value. A counter can be used for this, which is activated by a starting and a stopping signal, e.g. the received light pulse, and the emitted light pulse. A so-called interpolation is used to determine the error at the start and end of the counting by the counter. A delay circuit can be used for this. It is also possible to use two coordinated oscillators, or a so-called oversampling, e.g. a quadruple oversampling for sampling the signal. Based on the counting and the values obtained from the interpolation at the start and end of the counting, the time, and thus the time of flight, can be measured precisely.

The advantage with this method is obtained from the high temporal resolution of ca. 100 ps. This corresponds to a sampling rate of 10 GHz or a distance measurement precision of 1.5 m.

Alternatively, it is possible that the at least one digital to time converter maintains its cycle, and that other methods, described below, are then used for reducing the resolution.

It is also advantageous that the evaluation circuit has a sampler that generates sampling values from the electric signal, wherein the evaluation circuit has a signal processing unit for processing the sampling values, which consolidates the sampling values in order to reduce the resolution of the distance determination. Accordingly, it is possible to generate the electric signal for digitalized or at least corresponding pulses representing the present sampling value, wherein these sampling values can then be consolidated, corresponding to a reduction of the resolution of the distance determination, because these two sampling values can no longer be resolved. As explained above, the evaluation circuit, the signal processing unit, and other components can be implemented as software and/or hardware.

It is also advantageous that the evaluation circuit has at least one memory for at least one histogram, which carries out at least one bit shift for reducing the resolution of the distance determination. The lowest sampling values, for example, can be eliminated by a bit shift, in order to thus reduce the resolution of the distance determination. By way of example, the lowest bit, having the lowest value, is discarded in the corresponding index address in the memory, and the binary addresses in the histogram memory are shifted to the right by one bit for each step. By way of example, at a distance of 75 meters, there is no shift, thus a shift of 0 bits, and at a distance of 75 to 150 meters, there is a shift of 1 bit, and a shift of 2 bits at a distance of 150 to 300 meters. This results in a reduction in the resolution. This memory may be provided just for the histogram, but it can also be used as part of a semiconductor memory for the histogram. This can be a static or dynamic memory.

It is advantageous that the evaluation circuit stores 100 to 150 measurements, preferably 130 measurements, for each light pulse in the histogram. As explained above, presently an exemplary measurement period of 2000 ns is assumed, if a maximum distance of 300 meters is assumed for the distance measurement. 100 to 150, preferably 130, measurements per light pulse are then stored in the histogram, in order to determine the distance to the object via the time of flight.

It is advantageous that the receiver comprises a field of single photon avalanche diodes (SPAD), which can be activated by columns or rows in response to a signal from the transmitter circuit. It is presently assumed that a scanning of the surroundings, thus a sampling of the surroundings, of a vehicle is obtained through an activation of lasers in a laser array in columns or rows, and that accordingly, an activation or initiation of SPADs in columns or rows takes place in the array. This means that when the first column in the laser array is activated, the first column in the SPAD array is activated. The transmitting circuit advantageously characterizes the transmission of the light pulses. As a result, the activation of the column in the SPAD is synchronized therewith. It should be noted that there is a noise threshold, for example, in order to ensure that ambient light or diffused light not originating from the light pulses is filtered out. Ultimately, more than one photon is needed for generating an electric signal, which is then processed according to the invention in the evaluation circuit. The noise threshold is provided electronically.

BRIEF DESCRIPTION OF THE DRAWINGS

Exemplary embodiments of the invention shall be presented in the following description, and explained in reference to the figures, based on the exemplary embodiments. Therein.

DETAILED DESCRIPTION

Figure 1:
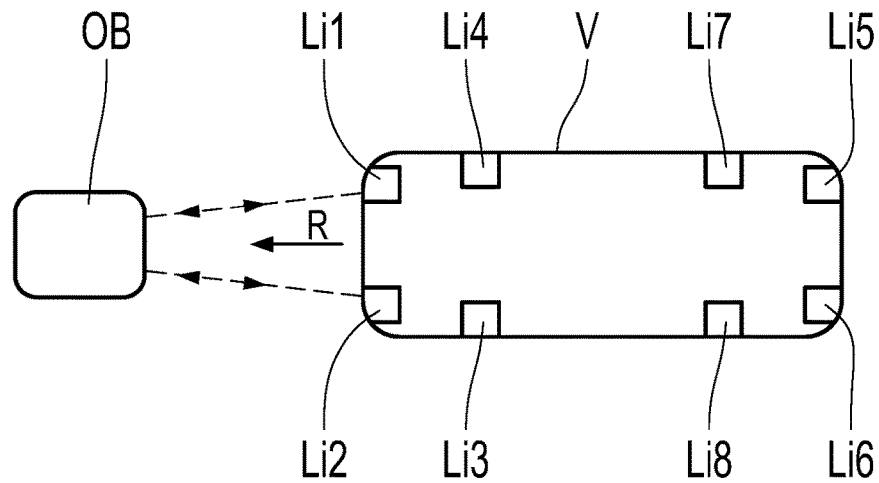
FIG. 1 shows an exemplary configuration of lidar modules in a vehicle.

FIG. 1 shows a vehicle V, moving in the direction R. The vehicle V contains the lidar modules Li1 to Li8. These lidar modules record the surroundings of the vehicle V. As a result, the object OB is detected by the lidar module Li1. As a result of a distance determination and a corresponding characterization of the object based on the movement parameters, it is possible to determine the probability of a collision, and to influence the movement of the vehicle V accordingly, in order to avoid colliding with the object OB.

The lidar modules Li1 to Li8 have a receiver assembly according to the invention, and a transmitter device, as described above, with a laser array, which emits laser pulses, in order to then receive the laser pulses reflected by the object OB with an SPAD array, and then evaluate them accordingly with the time-correlated photon counting, in order to determine the distance between the object OB and the vehicle V. A time of flight method is used for this.

Figure 2:
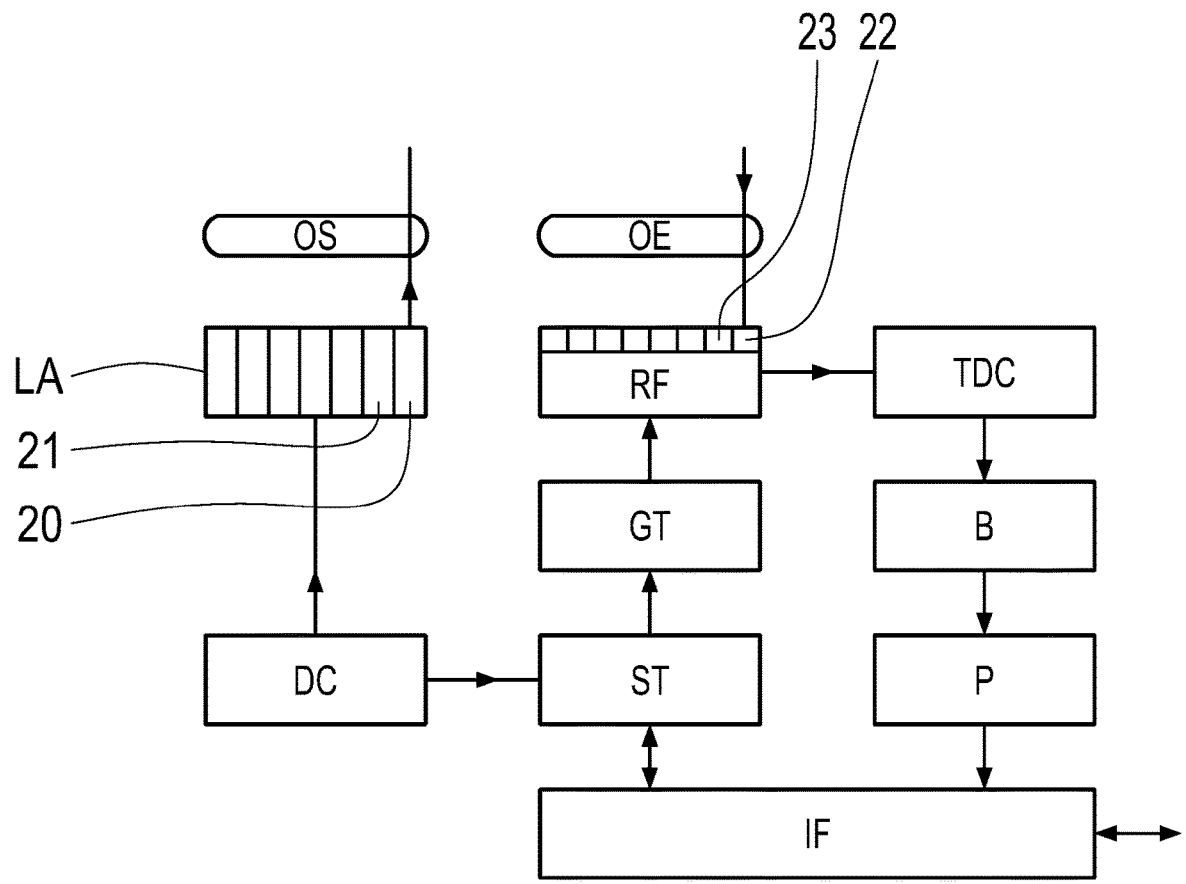
FIG. 2 shows a block diagram of a lidar module with the receiver circuit according to the invention.

FIG. 2 illustrates a lidar module with the receiver assembly according to the invention in a block diagram. The transmitter device has a laser array LA containing columns and rows 20, 21, etc. As explained above, these columns and rows 20, 21 are activated individually. The surroundings of the vehicle V are scanned in this manner. An optics element OS normally aligns the laser beams of the columns or rows 20 emitted by the laser array LA in parallel. This optics element may also exhibit different configurations.

The laser array LA is driven by a component DC, which contains a drive and a control unit for the laser array LA. As a result, the lasers in the laser array are operated at the desired operating points, such that they emit laser beams.

This component DC also outputs a signal to the receiver assembly and the control unit ST. There is a so-called front end RF in the receiver assembly, which preferably contains the SPAD array, which is likewise arranged in columns and rows 22, 23. The individual columns or rows are activated accordingly. It is shown herein that because the first column or row 20 in the laser array LA is activated, the first column or row 22 in the SPAD array is activated. There is also an optics element OE here, which aligns the light pulses that have been received in parallel for the individual columns. Corresponding electric signals are then generated in the receiver front end RF from the light pulses received by the SPADs. These signals are processed, wherein individual SPADs are then combined to form so-called macro-SPADs. This simplifies the signal processing, and there does not need to be a receiver or evaluation circuit for each diode in a SPAD.

The electric signal is then sent to a time to digital converter TDC for the time-correlated photon counting. The receiver front end RF is activated by a component GT in order to activate the corresponding column in the SPAD array. The component GT receives this signal from the control unit of the receiver circuit ST. The control unit ST is also connected to the exterior in the vehicle via the interface IF, i.e. it receives signals and also transmits signals to other components, e.g. external control devices, via this interface IF.

The time to digital converter TDC carries out the distance determination via the time-correlated photon counting in a histogram in the manner described above. This may or may not be stored temporarily in a buffer B, and is conveyed to a processing component P, where all the necessary calculations are carried out for determining distance data and the associated quality data from the measurement data. The data are output for further processing via the interface IF. Furthermore, the chip set is parameterized via the interface IF.

Figure 3:
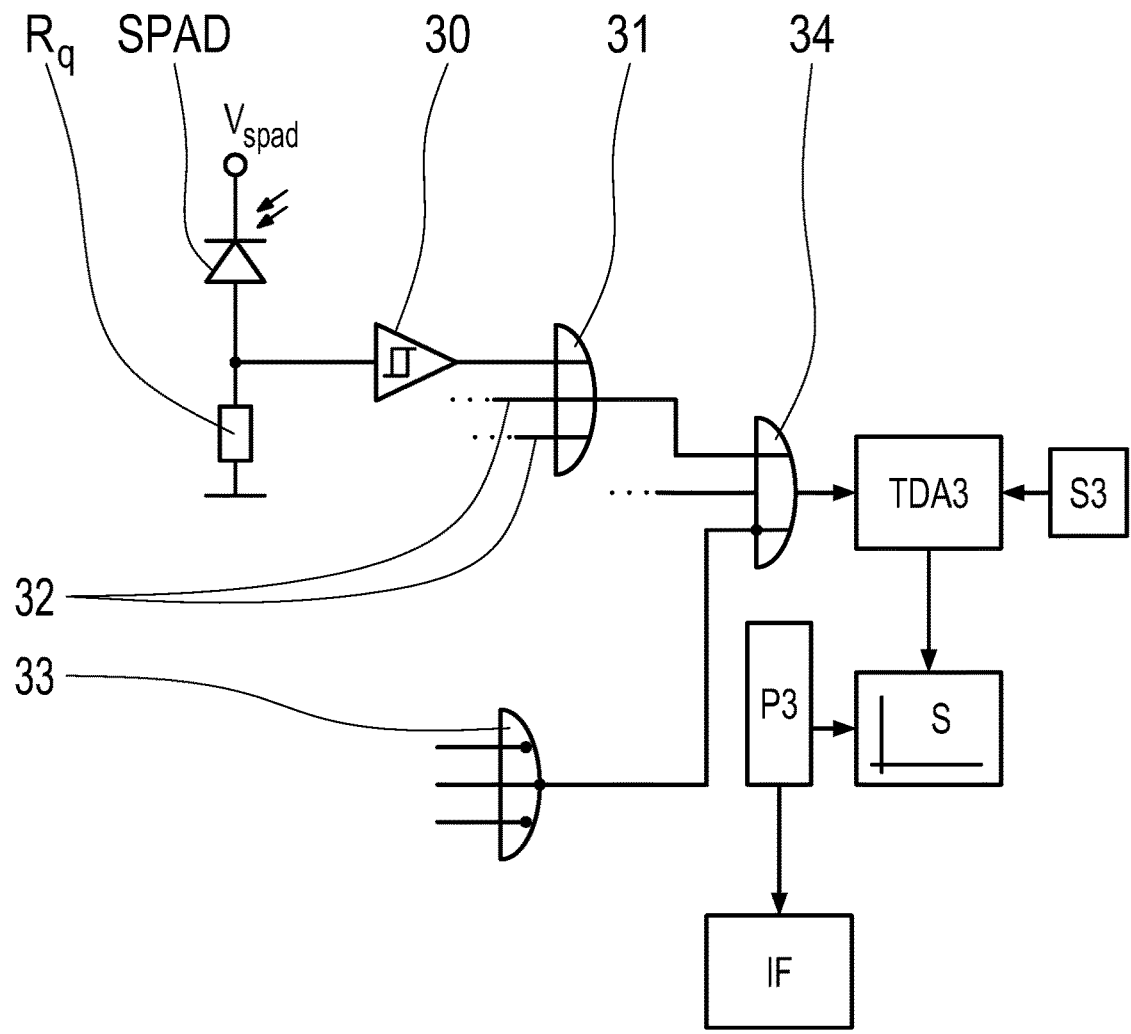
FIG. 3 shows an excerpt of the receiver circuit according to the invention.

FIG. 3 shows a portion of the circuitry of the receiver assembly according to the invention. Just one photodiode SPAD is shown therein, by way of example, which is subjected accordingly to the pre-voltage of the SPAD. So-called quenching takes place via the quenching resistor RQ: the avalanche effect is choked and ultimately stopped, primarily by the resistor RQ. This also takes place within a time period that is much shorter than 1 ns. This quenching is necessary for preventing the self-destruction of the photodiode. The quenching with a resistor, as is usually the case, is referred to as passive quenching. There are more complicated designs, which are named accordingly.

The electric output signal of the diode SPAD is sent to the pulse extender 30. This output signal is linked in an OR link 31 to other output signals 32 of other diodes in the same column. A so-called macro-diode or a macro-receiver is produced in this manner. This also takes place with other diodes in this column, symbolically indicated by the OR link 33. There can also be more OR links. These OR links are linked in turn to a further OR link 34. The overall signal is then sent to the time to digital converter TDA3. The TDA3 converts the pulse signals into time signals, which can then be entered in the histogram S. 130 measurements per measurement period, e.g. 2 ms, as indicated above, are then entered in the histogram. The time that is to be allocated to this light pulse is determined through the maximum search. The distance is then determined from this via the evaluation circuit P3. This distance can then be transmitted via the interface IF. A component S3, which can also be a software component, can act on the time to digital converter TDA3 such that the cycle is reduced. This reduces the temporal resolution and thus the distance resolution in the manner described above. As a result, space is saved in the memory S, in particular for the predetermined distance, starting when this reduction in resolution is to take place. Alternatively, it is possible for the reduction in the component S to be carried out by the evaluation circuit P3, in that, e.g. a bit shift is carried out, or sampling values are consolidated.

Figure 4:
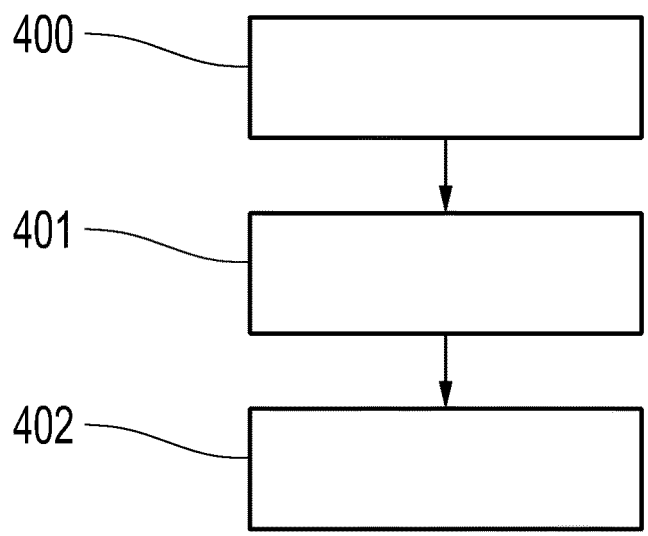
FIG. 4 shows a flow chart of the method according to the invention.

FIG. 4 shows a flow chart illustrating the method according to the invention, by way of example. The light pulse is converted to the electric signal in step 400, which is then used in step 401 to determine a distance via time-correlated photon counting. The temporal resolution, and thus the spatial resolution, is then reduced in step 402, when the distance reaches a predetermined value, e.g. 100 or 150 meters, or 175 meters.

Figures 5, 6:
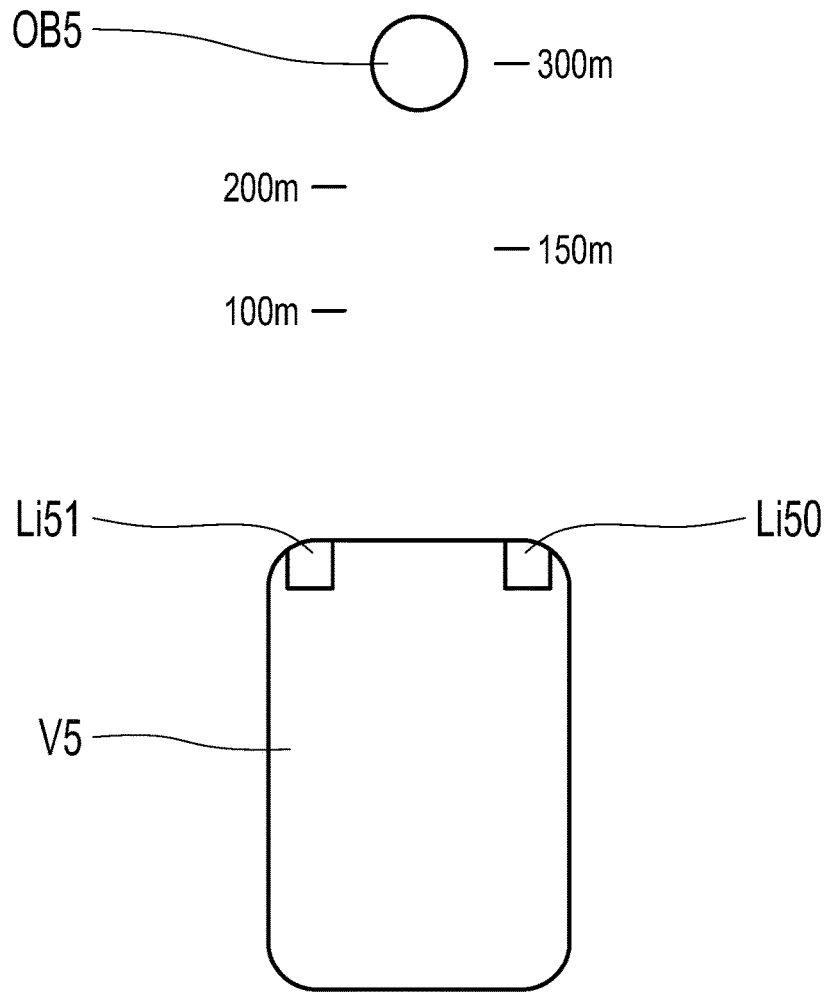
FIG. 5 shows an illustration of the object at various distances to the vehicle.
FIG. 6 shows a table, depicting the allocation of the temporal and spatial resolutions for the histogram.

FIG. 5 shows a situation in which there is an object OB5 at a distance of 300 meters to the vehicle V5. The vehicle V5 has 2 lidar modules Li50 and Li51 at the front of the vehicle. The object OB5 is thus at a distance at which a reduction of the temporal resolution of light pulses emitted from these lidar modules Li50 and Li51 takes place. An incremental reduction of the distance determination can also take plate, however, at other distances of 100 m, 150 m, and 200 m.

FIG. 6 shows an exemplary allocation of temporal resolution and spatial resolution in a table. The columns contain the temporal resolutions for each element in the histogram, indicated by the English word "bin." The values 125, 250 and 500 ps from above are specified. These correspond to a distance resolution in centimeters in the second column of 1.88, 3.75, and 7.5 cm. With a resolution of 125 ps per bin, 16,000 bins are needed in the third column for the entire measurement period. Accordingly, when halved, only 8,000 are needed, and when halved again, only 4,000. This shows the obvious advantage that can be obtained with regard to memory space. If the pulse sequence is added thereto, this increases to the values of 17,600, 8,800, and 4,400, as shown in the fourth column.

REFERENCE SYMBOLS

V, V5 vehicle
R direction
Li1-8 lidar modules
OB, OB5 object
LA laser array
20, 21 columns of the laser array
OS optics element
DC component
ST control unit
RF front end
22, 23 columns of the SPAD array
OE optics element
TDC time to digital converter
GT component
IF interface
P processing component
RQ quenching resistor
30 pulse extender
31, 33, 34 OR link
32 output interface
TDA3 time to digital converter
S memory for the histogram
P3 evaluation circuit
S3 component
400, 401, 402 method steps
Li50, 51 lidar modules

The invention claimed is:

1. A receiver assembly for receiving light pulses that has:
   at least one photosensitive receiver (SPAD), which converts the light pulses to an electric signal,
   an evaluation circuit connected to the receiver, which determines a distance between the receiver assembly and the at least one object that reflects the light pulses from the electric signal, by means of time-correlated photon counting with at least one histogram, via a time of flight of the light pulse and based on a starting signal for the light pulse, wherein the evaluation circuit is configured to reduce a resolution of the distance determination starting at no further than a predetermined distance,
   wherein the evaluation circuit has a control unit (ST), which reduces a cycle for determining the distance from the electric cycle for predetermined time periods,
   wherein the evaluation circuit has at least one time to digital converter for the time-correlated photon counting, wherein the control unit (ST) reduces the cycle of the at least one time to digital converter (TDC), and
   wherein the evaluation circuit stores 100 to 150 measurements per light pulse in the histogram.

2. The receiver assembly according to claim 1, wherein the evaluation circuit contains a sampler that generates sampling values from the electric signal, wherein the evaluation circuit contains a signal processing unit for the sampling values, which consolidates sampling values in order to reduce the resolution of the distance determination.

3. The receiver assembly according to claim 2, wherein the evaluation circuit stores 130 measurements per light pulse in the histogram.

4. The receiver assembly according to claim 2, wherein the receiver has a field of single photon avalanche diodes (SPADs), which can be activated in columns or rows, based on the signal.

5. A lidar module with a receiver assembly according to claim 2, and an emitter circuit that contains a laser array, wherein the laser array can be activated in columns or rows, and the starting signal characterizes the emission of the light pulses by a column or a row, wherein the corresponding column or row is activated in the field of the receiver by the signal.

6. The receiver assembly according to claim 1, wherein the evaluation circuit has a memory (S) for the at least one histogram, which carries out at least one bit shift in order to reduce the resolution of the distance determination.

7. The receiver assembly according to claim 6, wherein the evaluation circuit stores 130 measurements per light pulse in the histogram.

8. The receiver assembly according to claim 6, wherein the receiver has a field of single photon avalanche diodes (SPADs), which can be activated in columns or rows, based on the signal.

9. The receiver assembly according to claim 1, wherein the evaluation circuit stores 130 measurements per light pulse in the histogram.

10. The receiver assembly according to claim 1, wherein the receiver has a field of single photon avalanche diodes (SPADs), which can be activated in columns or rows, based on the signal.

11. A lidar module with a receiver assembly according to claim 1, and an emitter circuit that contains a laser array, wherein the laser array can be activated in columns or rows, and the starting signal characterizes the emission of the light pulses by a column or a row, wherein the corresponding column or row is activated in the field of the receiver by the signal.

12. A method for receiving light pulses comprising:
conversion of the light pulses to an electric signal by a photosensitive receiver (SPAD),
determination of a distance between a receiver circuit and at least one object (OB) that reflects the light pulses from the electric signal, by means of a time-correlated photon counting with at least one histogram, via a time of flight of the light pulse and based on a starting signal for an emission of the light pulse,
reduction of a resolution of the distance determination starting at no further than a predetermined distance,
reduction of a cycle for determining the distance from the electric cycle for predetermined time periods by means of a control unit (ST),
reducing the cycle of the at least one time to digital converter by means of the control unit (ST) and
storing 100 to 150 measurements per light pulse in the histogram.

\* \* \* \* \*